Feb. 17, 1925.　　　　　　　　　　　　　　1,527,084
E. SCHRÖDER
ELECTRODE ARRANGEMENT FOR ELECTRIC WELDING MACHINES
Filed Feb. 3, 1922

Edmund Schröder.
Inventor.

By William C. Linton,
Attorney.

Patented Feb. 17, 1925.

1,527,084

UNITED STATES PATENT OFFICE.

EDMUND SCHRÖDER, OF BERLIN, GERMANY, ASSIGNOR TO THE FIRM, BRAUN-BRÜNING & CO., OF BASEL, SWITZERLAND.

ELECTRODE ARRANGEMENT FOR ELECTRIC WELDING MACHINES.

Application filed February 3, 1922. Serial No. 533,932.

*To all whom it may concern:*

Be it known that I, EDMUND SCHRÖDER, engineer, a citizen of German Republic, residing at Berlin, in the Republic of Germany, have invented certain new and useful Improvements in Electrode Arrangements for Electric Welding Machines; and I do hereby declare that the following is a full, clear, and exact description of the invention, such as will enable others skilled in the art to which it appertains to make and use the same.

Figure 1:
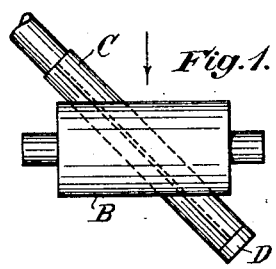
Figure 2:
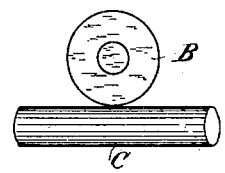
Figure 3:
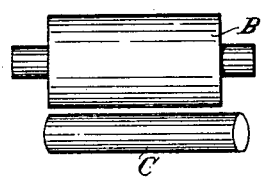
Figure 4:
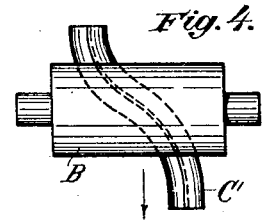
Figure 5:
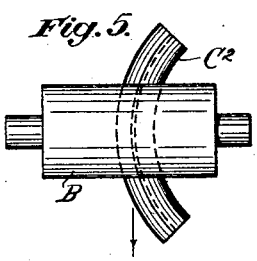
Figure 6:
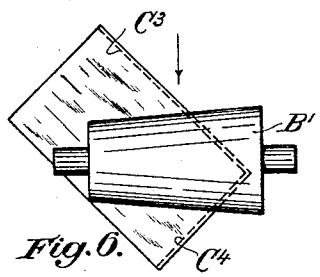
Figure 7:
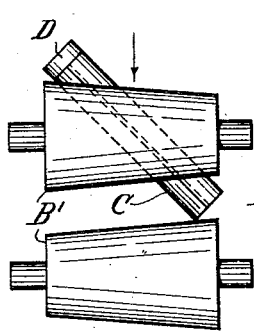
Figure 8:
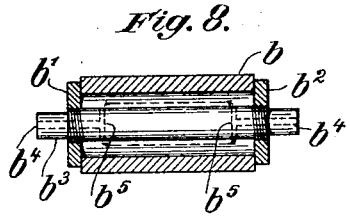

This invention relates to a novel combination and arrangement of parts for use in connection with electrical resistance welding machines. The invention is diagrammatically illustrated in the accompanying drawing, in which Figure 1 is a plan of a novel arrangement of the electrodes of such a machine. Figure 2 is a side view of these electrodes. Figure 3 is also a side view, but at right angles with respect to Figure 2. Figure 4 is an illustration similar to Figure 1 showing a modification. Figures 5, 6, and 7 show also modifications, and Figure 8 is an axial section through a cylindrical electrode, as is all more fully described hereinafter.

Referring to Figures 1, 2, and 3, the electrode D is that which supports the work piece C and is shaped so as to fit to the same; it forms a cylindrical mandrel if cylindrical hollow bodies are to be welded, and it forms a flat bar if the bodies to be welded are of angular section. The electrode D is stationary with respect to the work-piece C, and, may be, also with respect to the rotary counter-electrode B. In the first case it moves together with the work-piece to the stationary, but rotary, counter-electrode B which rotates upon the seam; in the other case, the counter-electrode B rolls along upon the same.

The novelty resides in the features, firstly, that the axis of the rotating electrode lies obliquely with respect to the direction of the seam to be welded, or being welded respectively, and secondly, that the length of the rotary electrode is such that it can act upon the whole length of the seam when moving over it in the direction of the arrow shown in Figure 1. The direction either of the electrode B or of the oblique electrode D with the work-piece C must always be at right angles to the axis of the rotary electrode, and the whole length of the seam must be acted on whilst the one electrode moves along over, or below, the other.

Material advantages are obtained by this novel arrangement in contradistinction to the known ones in which the axis of the rotary electrode lies at right angles to the seam. First of all, a certain length of seam can be covered on a way which is considerably shorter than that seam, namely just because of the oblique position of the electrode carrying the work-piece. Thus, for instance, in the case of the angle between the two axes amounting to 45°, as in Figure 1. Furthermore, the welding electrode surface is considerably larger than in the case of the application of a roll instead of a roller, as in Figures 1–3. The wear and tear is, therefore, by far smaller. And if step-wise welding is employed (so-called roll step welding, if a roll is made use of, as hitherto), the single welding places which follow each other in the seam and form it become longer in the direction of the seam, but small at right angles thereto. The steps may, thus, be longer and the welding proceeds correspondingly quicker. But the novel arrangement makes still other and novel effects possible, as will appear from the following portion of this specification.

It is, for instance, possible to weld a curved seam on a rectilinear way, as shown at $C^1$ and $C^2$ in the two examples Figures 4 and 5, or two seams which lie at an angle relatively to one another, or form an angle with each other respectively, may be welded in one straightway course of operation, as shown as another example in Figure 6, in which a lateral seam $C^3$ and a bottom seam $C^4$ are welded in immediate succession and without change of direction. In cases like this or similar ones the rotary electrode has either conical shape, as shown at $B^1$ in Figure 6, or its axis is obliquely directed with respect to the plane of the work piece, the reason being in both cases to prevent the rotary electrode from contacting with other portions of the work piece than with those where the seam is to be formed.

As the wear and tear gets distributed over a large surface, viz the circumferential surface of the rotary electrode, be it cylindrical or conical, the diameter of the rotary electrode need be but short. Furthermore, two neighbouring seams, or a double seam respectively, may be produced at a time, also if the seams are, or the double seam is, comparatively short. In such a case two rotary rollers are made to operate immediately one after the other, as shown in Figure 7, and the distance between the two seams, or the two parallel portions of the double seam respectively, is determined either by a suitable conicity of the rotary electrodes, such as $B^1$, or by oblique arrangement of their axes, as already mentioned with respect to Figure 6.

The rotary electrode may be constructed in the manner shown in Figure 8. It consists in this example of a tubular piece of copper $b$ which is held fast between two bronze disks $b^1$ $b^2$ which are screwed upon the axle or shaft $b^3$. The journals of this latter are, or at least one of them is, connected with the circuit. The axle or shaft $b^3$ has axial bores $b^4$ and radial bores $b^5$ with aid of which cooling water is conducted through the interior of the electrode. Replacing the worn-out mantle $b$ of the electrode by another one may obviously be very easily accomplished in this form of construction of the rotary electrode. The inner surface of the mantle may have threads or other projections, for instance ribs or lugs, which increase the surface exposed to the action of the cooling water.

The novel electrode arrangement as above described may be employed also in connection with multi-phase current and gives particularly good results just with this kind of current.

Having now described my invention, what I desire to secure by a patent of the United States is:—

1. An electric seam welding machine comprising in combination, an electrode adapted to receive the work to be welded, and a relatively wide rotatable electrode arranged at an angle with respect to the work receiving electrode whereby upon each revolution of said rotary electrode, the surface of the latter will pass completely over the entire seam of the work to be welded.

2. An electric seam welding machine comprising in combination, a stationary electrode adapted to receive the work to be welded, a counterelectrode movable over said stationary electrode, the axis of said counterelectrode extending at an oblique angle to the axis of said stationary electrode whereby the direction of travel of said counterelectrode will be at right angles to said stationary electrode, substantially as and for the purpose specified.

3. In an electric welding machine for welding seams by means of resistance welding, the combination, with a rotary electrode, of another electrode adapted to support a curved work piece and being itself correspondingly curved and so arranged with respect to the rotary electrode that the welding is effected by different portions of the circumferential surface of the said rotary electrode during the relative motion of the two electrodes, the length of the rotary electrode being such that the seam may be welded at one passage of the electrodes relatively to one another in a direction which lies at right angles with respect to the axis of the said rotary electrode.

4. In an electric welding machine for welding seams by means for resistance welding with the application of the multi-phase current, the combination, with a rotary electrode, of a non-rotary electrode shaped according to the longitudinal direction of the seam to be made and being adapted to receive and support the work-piece and being so arranged with respect to said rotary electrode that the seam may be welded at one passage of the electrodes relatively to one another in a direction which lies at right angles with respect to the axis of the said rotary electrode.

In witness whereof I have hereunto set my hand.

EDMUND SCHRÖDER.